Patented Jan. 20, 1953

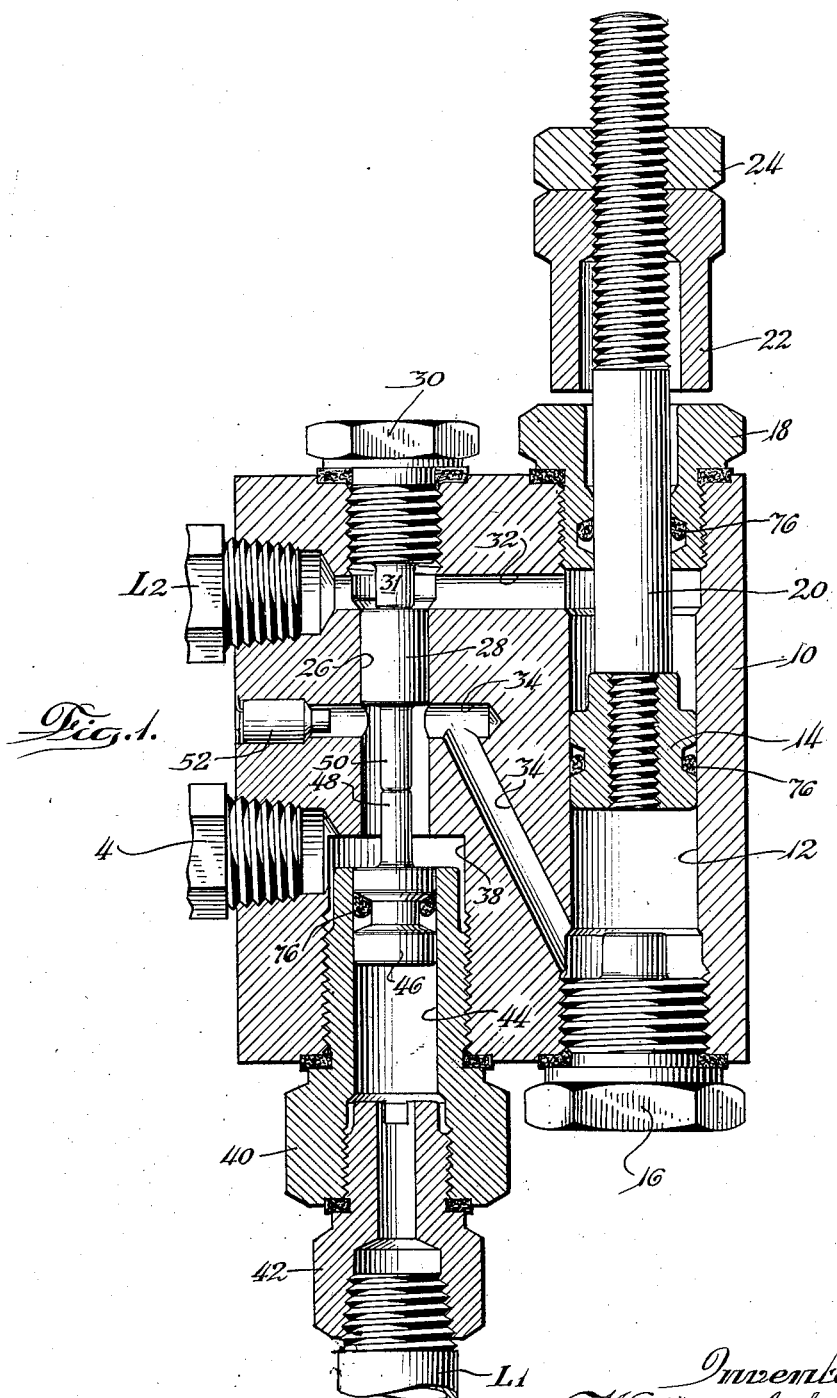

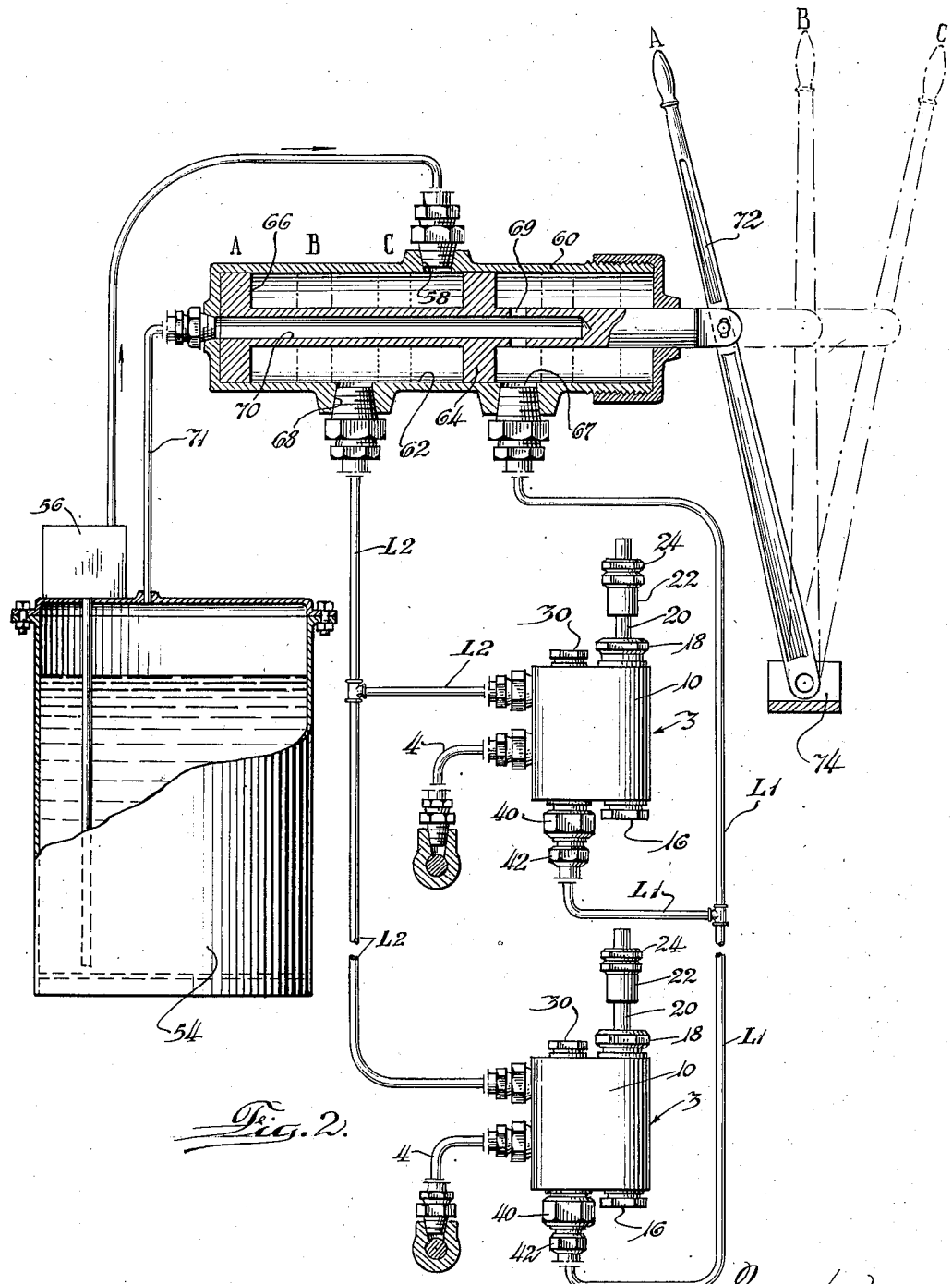

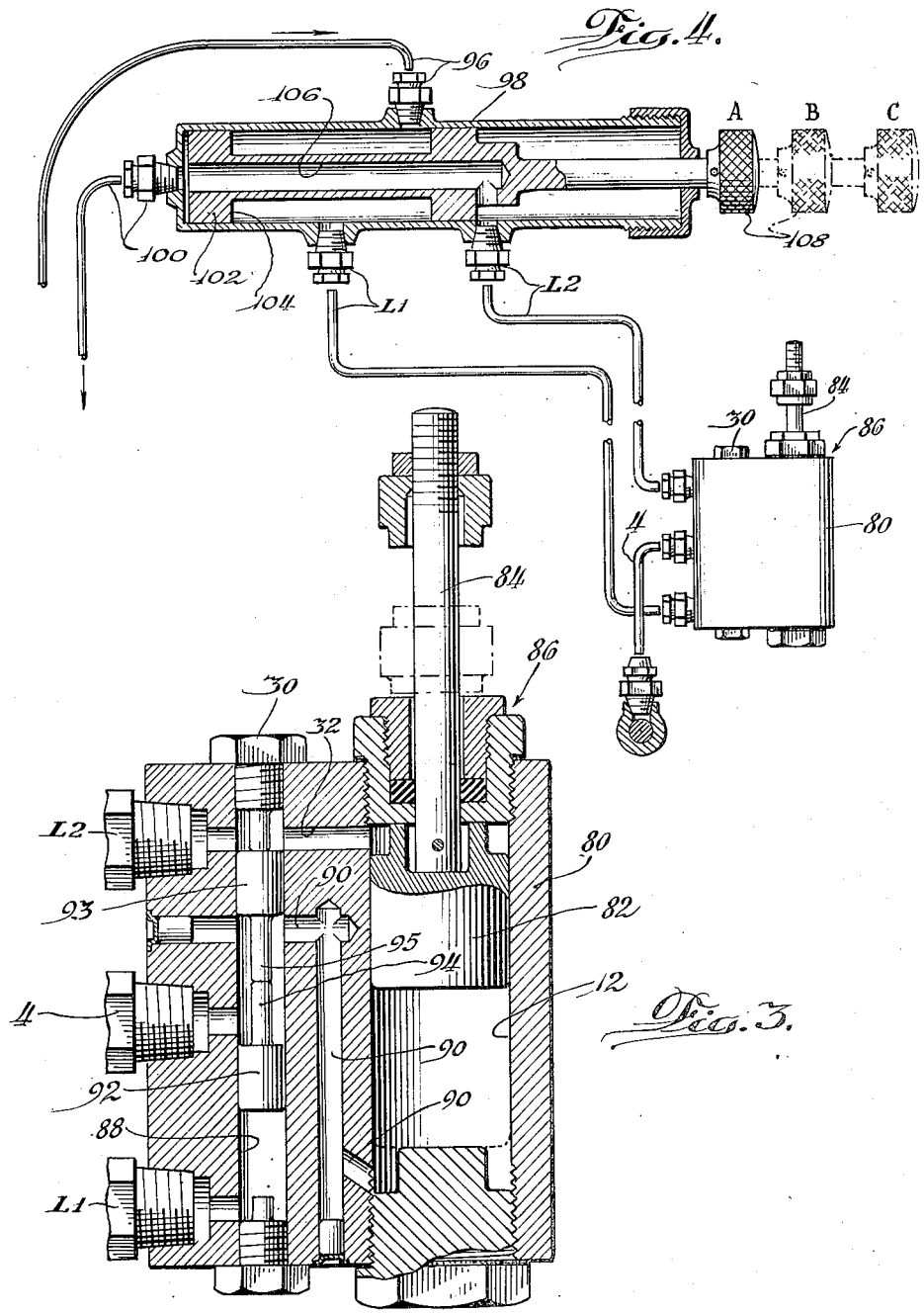

2,626,014

UNITED STATES PATENT OFFICE 2,626,014

MEASURING VALVE FOR CENTRALIZED LUBRICATING SYSTEMS

Walter Schmid, Chicago, Ill., assignor to Stewart-Warner Corporation, Chicago, Ill., a corporation of Virginia Application September 24, 1949, Serial No. 117,549

8 Claims. (Cl. 184—7)

My invention relates generally to measuring or feeder valves for use in centralized lubricating systems, and more particularly to a valve of this type for use in so called dual line or dual manifold lubricating systems.

It is an object of the invention to provide an improved measuring or feeder valve for use in dual line centralized lubricating systems for the accurate measuring and discharge of lubricant to parts requiring lubrication, in response to variations in pressure in two conduits connected to the valve.

A further object is to provide an improved measuring valve of the above mentioned type, in which the parts are moved in both directions by lubricant pressure, so that the use of return springs is not required.

A further object is to provide an improved measuring or feeder valve of the above mentioned type, which may be manufactured without employing precision processes, and which will nevertheless function reliably to discharge accurately measured quantities of lubricant to bearings or other parts to be lubricated, upon each cycle of operation.

Other objects will become apparent from the following description, reference being had to the accompanying drawings, in which Fig. 1 is a central vertical cross sectional view of the improved measuring or feeder valve;

Fig. 2 is a diagrammatic view illustrating a lubricating system employing measuring valves of the type shown in Fig. 1, and showing particularly the valve by which the flow of lubricant from the pump to the measuring valves is controlled;

Fig. 3 is a central vertical sectional view of a modified form of the feeder valve; and Fig. 4 is a diagrammatic view illustrating the lubricating system employing feeder valves of the construction shown in Fig. 3.

The measuring and feeder valves 3 are adapted to be connected in parallel, as illustrated diagrammatically in Fig. 2, to two line conduits L1 and L2, each of the valves 3 being connected by a conduit 4 to a part to be lubricated, such as a bearing 6. The two valves 3 shown in Fig. 2 are intended to be representative of a large group of such valves connected between conduits L1 and L2.

The measuring or feeder valve comprises a body 10 having a cylinder 12 formed therein, in which a piston 14 is reciprocable. The lower end of the cylinder 12 is closed by a plug 16 and the upper end is closed by a packing gland 18 forming a seal for a piston stem 20, which is secured to the piston 14. The outer end of the stem 20 is threaded to receive a stroke adjusting sleeve nut 22 which is secured in adjusted position by a lock nut 24, and serves as an indicator of the position of the piston 14.

The body 10 is also provided with a bore 26 for the reception of a piston valve 28, which is freely reciprocable therein, the upper end of the bore 26 being closed by a plug 30 having a stop projection 31. The upper end of the bore 26 communicates with the upper end of the cylinder 12 by way of a passageway 32 which extends through the upper end of the bore 26, and is connected to line conduit L2. The central portion of the bore 26 is connected by a duct 34 with the lower end of the bore 12, while the lower extremity of the bore 26 communicates with an enlarged bore 38 to which the discharge conduit 4 is connected. Threaded within the lower end of bore 38 is a valve cylinder fitting 40 which is connected to line conduit L1 by a coupling 42. The fitting 40 is provided with an axial bore 44 providing a cylinder in which a piston 46 is reciprocable, the piston having a stem 48 which extends upwardly and is normally in contact with a stem 50 extending downwardly from the piston 28. The bore 44 and piston valve 46 are of greater diameter than the bore 26. The end of the passageway 34 is closed by a plug 52.

As shown in Fig. 2, lubricant is supplied to the lines L1 and L2 from a suitable source 54 by a pump 56, the discharge of which is connected to an inlet port 58 of a control valve body 60. This body is provided with a valve cylinder 62 in which a spool valve member 64 is slidable, this valve having an annular passageway 66 which, depending upon the position of the valve 60, may connect the inlet port 58 with an outlet port 68 connected to conduit line L2, or with a port 67 to which line conduit L1 is connected. The right-hand end of the cylinder 62 is vented through ports 69 and a passageway 70 drilled axially through the valve 64, the left-hand end of the cylinder 62 being connected to the reservoir 56 by a conduit 71.

The valve 64 has three operative positions, position A shown in full lines, in which lubricant under pressure is directed to conduit L2 and the conduit L1 is vented; position B, in which lubricant under pressure is supplied to both line conduits L1 and L2; and position C, in which lubricant under pressure is supplied to line conduit L1 only and conduit L2 is vented, positions B and C being indicated by the dash line showing of the end land portion of the valve. The control valve may be operated in any suitable manner, but is shown as being adapted to be manually operated by means of a handle lever 72 pivoted on a fixed support 74 and pivotally connected to the valve member 64. The seals for the pistons and the gland 18 are preferably provided by loosely confined ring gaskets made of a suitable oil resistant synthetic rubber.

In operating the lubricating system according to one method, the control valve 64 is put in position C, and lubricant under pressure flowing through conduit L1 moves the piston 46 upwardly to the position in which it is shown in Fig. 1, at the same time pushing the piston 28 upwardly until the movements of both of these pistons are limited by the contact of piston 28 with the projection 31 of the plug 30. Since conduit L2 is vented during this portion of the cycle of operation, the piston 28 is free to move upwardly. Since there is no substantial pressure difference on the opposite sides of piston 14, the latter will remain in the position to which it was last moved.

Thereafter, the control valve 64 is moved to the position B in which both conduit lines L1 and L2 are connected to the pump 56 and are thus supplied with lubricant under pressure. Since the cross sectional area of the piston 46 is substantially greater than that of piston 28, these two pistons will remain in the position shown in Fig. 1. However, since pressure will be applied to the upper end of the cylinder 12, and since the lower end of this cylinder is connected to the bearing 16, which presumably does not offer excessive resistance to the flow of lubricant, the piston 14, together with its stem 20, will be moved downwardly to an extent limited by the adjustment of sleeve 22, and lubricant in the cylinder 12 below the piston 14 will be discharged to the bearing.

After all of the measuring valves have operated, as may be observed from the positions of their piston stems 20, the control valve 64 is moved to the position A, in which position lubricant under pressure is supplied only to the conduit L2, while the conduit L1 is vented. Under these conditions, the piston 28 is moved downwardly, also forcing the piston 46 downwardly, until the upper end of the piston 28 moves beyond the end of the passageway 34. Lubricant may then flow past the piston 28 through the passageway 34 into the lower end of the cylinder 12. Of course, lubricant pressure is also applied to the upper end of the cylinder 12 through the passageway 32, but because of the differential area of the piston 14, it is forced upwardly and the lubricant in the upper end of the cylinder 12 is discharged through the passageway 32. The piston 14 thus moves upwardly until it contacts the packing gland 18 and the lower end of the cylinder 12 is thus recharged with lubricant. A cycle of operation of the valve is thus completed, so that when the control valve 64 is again moved to position C, the pistons 46 and 28 may again be moved upwardly to their full line positions and the lubricant contained in the lower end of the cylinder 12 discharged to the bearings when the pressure is applied to conduit line L2.

In an alternative method of operating the lubricating system, it is not necessary that the control valve 64 be moved to position C, but instead, the cycle may be considered as being commenced by placing the control valve in position B, under which condition the piston valves 46 and 28 will be moved to the position in which they are shown in Fig. 1, by virtue of the fact that the effective area of the piston 46 is greater than that of the piston 28. The piston 14 will be moved downwardly to discharge lubricant to the bearing. After all of the measuring valves 3 have been operated through this portion of their cycle, as may be noted from the positions of their piston stems 20, the control valve 64 is moved to position A so that conduit L2 is connected to the pump 56 and conduit L1 is vented.

Lubricant flowing through conduit L2 will force the piston valve 28 downwardly, the latter also moving the piston 46 downwardly. The piston 46 may move downwardly since the lower end of cylinder 44 is connected to the vented conduit L1. When the piston valve 28 has moved past the end of the passageway 34, lubricant may flow freely through the cylinder 26 and the passageway 34, to the lower end of cylinder 12, forcing the piston 14 upwardly, thus to recharge the measuring valve.

It will be understood that the operation of the lubricating system in the last described manner is contingent upon the fact that the effective area of the piston 46 is greater than that of the piston valve 28, while the system could be operated in the manner first above described if the pistons 46 and 28 were of the same effective area.

A feeder valve of the type in which the valve pistons are of the same cross sectional area, is shown in Figs. 3 and 4. Most of the parts of this modified form of feeder valve are similar to those previously described with reference to Fig. 1, and similar reference characters have accordingly been applied to the corresponding parts.

As shown in Fig. 3, the feeder valve comprises a body 80 with the measuring cylinder 12 having a piston 82 freely reciprocable therein, the piston having a self-centering connection with a piston rod 84 which extends through a packing gland 86. The body is also provided with a valve cylinder 88 which is of uniform diameter throughout its length. The ends of the bore 88 are respectively connected to conduits L1 and L2, while a passageway 90 connects the head end of the measuring cylinder 12 with the bore 88 intermediate its ends. A pair of similar valve pistons 92 and 93 are freely reciprocable within the bore 88, and have reduced diameter extensions 94, 95 which normally contact one another.

The control valve shown in Fig. 4 is supplied with lubricant under pressure through a conduit 96 and comprises a cylinder 98 to which conduits L1 and L2 are connected. A vent conduit 100 is connected to one end of the valve cylinder 98 and a spool type valve 102 having a groove 104 and a venting passageway 106 is reciprocable in the valve cylinder 98 by means of a knob 108, this valve having three positions, indicated by the full and dotted line representations of the knob 108, the positions being designated A, B, and C.

Assuming that the feeder valve and system have been charged with lubricant, and that the parts of the feeder valve are in the position shown in Fig. 3, the control valve knob 108 is moved to position B, in which conduits L1 and L2 are supplied with lubricant under pressure. Lubricant will thus flow into the upper end of the measuring cylinder 12, forcing the piston 82 downwardly to discharge lubricant to the part to be lubricated through passageway 90, the portion of the cylinder bore 88 around the reduced diameter portions 94, 95 of the piston valves 92, 93, and hence to the conduit 4. After all of the feeder valves connected to the system have thus been operated to dispense their charges to the part to be lubricated, as will be indicated by the positions of the piston stems 84, the operator will shift the control valve knob to position C, in which position lubricant under pressure will be supplied to conduit L2 and conduit L1 will be vented. Pressure acting on the upper end of valve piston 93 will therefore force the latter, together with the valve piston 92, downwardly, until the end of the passageway 90 is uncovered by the upper end of the valve piston 93. Both ends of the cylinder 12 will therefore be connected under pressure, and due to the differential action of the piston 82, the latter will be forced upwardly and the head end of the cylinder recharged with lubricant.

After all of the feeder valve have thus been recharged, as will be noted by the fact that their piston stems 84 are extended to the maximum distance, the operator will move the control valve knob 108 to position A, whereupon lubricant under pressure will be supplied to conduit L1 and conduit L2 will be vented. The valve pistons 92, 93 will therefore be forced upwardly to complete a cycle of operation.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A fluid measuring valve comprising means having an outlet and forming a measuring cylinder having a rod end and a head end, a piston reciprocable in the cylinder, a piston rod secured to the piston and extending to the atmosphere through the rod end of the cylinder, a pair of passageways for receiving fluid under pressure, means connecting the first of said passageways to the rod end of the cylinder, a two position valve device effective when in its first position to connect the two ends of the cylinder and when in its second position to connect the head end of the cylinder to the outlet, said valve device being moved to its first position by pressure of the fluid in the first passageway while the pressure in the second passageway is relieved, and piston means acted upon by fluid pressure in the second passageway to move the valve to its second position when fluid under substantially the same pressure is supplied to both of said passageways.

2. A measuring valve comprising means having an outlet and forming a measuring cylinder having a rod end and a head end, a piston reciprocable in the cylinder, a piston rod secured to the piston and extending to the atmosphere through the rod end of the cylinder, a pair of passageways for receiving fluid under pressure, means connecting the first of said passageways to the rod end of the measuring cylinder, a valve for alternately connecting the head end of the cylinder to the rod end thereof and to a fluid outlet, and means operated by the pressure of the fluid when supplied to both of the passageways at the same time to move the valve to one of its two alternate positions and when supplied to only the first of said passageways to move the valve to its other alternate position.

3. A measuring valve comprising means forming a measuring cylinder having a rod end and a head end, a piston reciprocable in the cylinder, a piston rod secured to the piston and extending to the atmosphere through the rod end of the cylinder, a pair of passageways for receiving fluid under pressure, means connecting one of said passageways to the rod end of the measuring cylinder, a valve for alternately connecting the head end of the cylinder to the rod end thereof and to a fluid outlet, and means operated by the pressure of the fluid supplied alternately to the two passageways to reciprocate the valve between its two alternate positions.

4. A measuring valve comprising means forming a measuring cylinder having a rod end and a head end, a piston reciprocable in the cylinder, a piston rod secured to the piston and extending to the atmosphere through the rod end of the cylinder, a pair of passageways for receiving fluid under pressure, means connecting one of said passageways to the rod end of the measuring cylinder, a valve for alternately connecting the head end of the cylinder to the rod end thereof and to a fluid outlet, and means operated by the pressure of the fluid supplied to the two passageways to reciprocate the valve between its two alternate positions.

5. A feeder valve for centralized lubricating systems for connection to a pair of lubricant pressure conduits in which the lubricant under pressure is alternately supplied only to the first of the conduits and then to both of the conduits, the combination of a body having a measuring cylinder having a rod end and a head end, a piston reciprocable in the measuring cylinder and having a rod extending to the atmosphere from the rod end thereof, a passageway connecting the opposite rod and head ends of the cylinder, a duct connecting the rod end of the cylinder to the first of the lubricant supply conduits at all times, a discharge port in the body for connection to a part to be supplied with lubricant, and a two-position valve operable in its first position to close said passageway and to connect the head end of the cylinder to the discharge port and operable in its other position to open said passageway and to cut off communication of the head end of the cylinder with the discharge port, the valve including differential piston means respectively subjected to the lubricant pressure in said conduits to operate said valve.

6. A fluid measuring device comprising means having an outlet and forming a measuring cylinder having a rod end and a head end, a piston reciprocable in the measuring cylinder, a piston rod secured to the piston and extending to the atmosphere through the rod end of the cylinder, a first and a second passageway for receiving fluid under pressure, a valve cylinder having its ends connected to said passageways respectively, a piston valve device reciprocable in said valve cylinder, a duct connecting the head end of the measuring cylinder to the valve cylinder at a point intermediate its ends whereby the piston valve in its first position will connect the duct to the outlet and in its second position will connect the duct to the second passageway, means for supplying fluid under pressure to the first passageway only to cause the valve device to move to its first position, thereafter to supply the fluid under pressure to both passageways to cause the measuring piston to move toward the head end of the measuring cylinder and thereby discharge the fluid at the head end of the cylinder through the duct and intermediate portion of the valve chamber to the outlet, and finally, upon supplying the fluid under pressure to the second passageway only, to move the valve device to its second position and thereby cause flow of the fluid from the second passageway to the head end of the measuring cylinder, thereby to recharge the latter.

7. A measuring valve mechanism for centralized lubricating systems of the dual line conduit type in which lubricant under pressure is supplied both to a first line conduit and to a second line conduit, and then to said second line conduit while relieving the pressure in said first line conduit, comprising means forming a discharge port and a measuring cylinder having a rod end and a head end, a piston reciprocable in said measuring cylinder, a piston rod secured to said piston and extending from said cylinder, means for connecting the rod end of the cylinder permanently to said second line conduit, means forming a passageway for connecting the head end of the cylinder to a part to be supplied with lubricant, a pair of cylinders of different diameters having their opposite ends connected respectively to said first line conduit and said second line conduit, cooperating pistons in said pair of cylinders, the piston of smaller diameter being operable to close said passageway and to connect the ends of said measuring cylinder when lubricant under pressure is supplied to said second line conduit only, and operable to open said passageway and to cut off the connection between the ends of said measuring cylinder when lubricant under pressure is supplied to both line conduits.

8. In a centralized lubricating system having a source for supplying lubricant under pressure, a first line conduit and a second line conduit, the combination of valve means connecting said source alternately to both line conduits and to the second line conduit only, a lubricant feeder valve body having a discharge port and a measuring cylinder having a rod end and a head end, a piston reciprocable in said cylinder, a rod on said piston extending through the rod end of the cylinder, means connecting the rod end of said cylinder to said second line conduit, a passageway connecting the ends of said measuring cylinder, a duct connecting the head end of said measuring cylinder to said discharge port, movable valve means operable in one position to stop the flow of lubricant through said passageway and operable in another position to stop the flow of lubricant through said duct, and means operable by the lubricant pressure transmitted through said second line conduit to move said valve means to passageway opening position and to duct closing position when lubricant under pressure is supplied to said second line conduit only, and when lubricant under pressure is supplied through both line conduits, to move said valve means to passageway closing position and to duct opening position.

WALTER SCHMID.

REFERENCES CITED

The following references are of record in the file of this patent:

UNITED STATES PATENTS

| Number | Name | Date |
|---|---|---|
| 1,953,222 | Gordon | Apr. 3, 1934 |

FOREIGN PATENTS

| Number | Country | Date |
|---|---|---|
| 475,745 | Great Britain | Nov. 25, 1937 |